United States Patent [19]
Graham et al.

[11] 3,912,100
[45] Oct. 14, 1975

[54] COATED GLASS CONTAINER AND METHOD OF MAKING SAME

[75] Inventors: Paul W. L. Graham, Toledo; Thomas W. Moore, Jr., Perrysburg; Charles F. Mann, Maumee, all of Ohio

[73] Assignee: Owens-Illinois, Inc., Toledo, Ohio

[22] Filed: June 21, 1973

[21] Appl. No.: 372,156

[52] U.S. Cl.............................. 215/12; 215/DIG. 6
[51] Int. Cl.............................................. B65d 11/16
[58] Field of Search....... 215/1 C, 12 R, 13, DIG. 6; 150/52 R; 156/78, 79, 85, 86

[56] References Cited
UNITED STATES PATENTS

| | | | |
|---|---|---|---|
| 3,007,594 | 11/1961 | Wallace | 215/DIG. 6 |
| 3,110,554 | 11/1963 | Yazumi | 215/12 R X |
| 3,542,229 | 11/1970 | Beyerlein | 215/12 R X |
| 3,604,584 | 9/1971 | Shank | 215/DIG. 6 |
| 3,698,586 | 10/1972 | Terner | 215/DIG. 6 |
| 3,734,765 | 5/1973 | Russell | 117/124 E |
| 3,738,524 | 6/1973 | Richie | 215/341 |
| 3,760,968 | 9/1973 | Amberg et al. | 215/12 R |

FOREIGN PATENTS OR APPLICATIONS

| | | | |
|---|---|---|---|
| 1,469,340 | 1/1967 | France | 215/12 R |

*Primary Examiner*—Herbert F. Ross
*Attorney, Agent, or Firm*—J. R. Nelson

[57] ABSTRACT

The invention disclosed pertains to a method and article formed thereby, wherein a container is encased in a multi-part plastic functional coating to enhance the strength of the container; and, in the case of frangible materials used in making pressurized containers, such as glass bottles for beer and carbonated beverage products, retain fragments upon breakage. The functional coating is formed by first applying organic plastic materials over localized exterior surface areas of the container, e.g. the neck or neck and bottom regions of a bottle, or over the whole exterior surface area of the container so that the plastic material conforms to the surface areas in snug fitting relation. This is followed by placing a sleeve of heat shrinkable thermoplastic material over the exterior body of the container overlapping the first plastic coating at least in one area and heating the sleeve to shrink it over the first coating and the container joining the two plastics together. In another embodiment, the sleeve is first shrunken on the container and the organic plastic applied to overlap the sleeve in whole or in part and all or part of the remainder of the container's surface not covered by the sleeve so as to encapsulate the bottle or sleeve and bottle.

14 Claims, 15 Drawing Figures

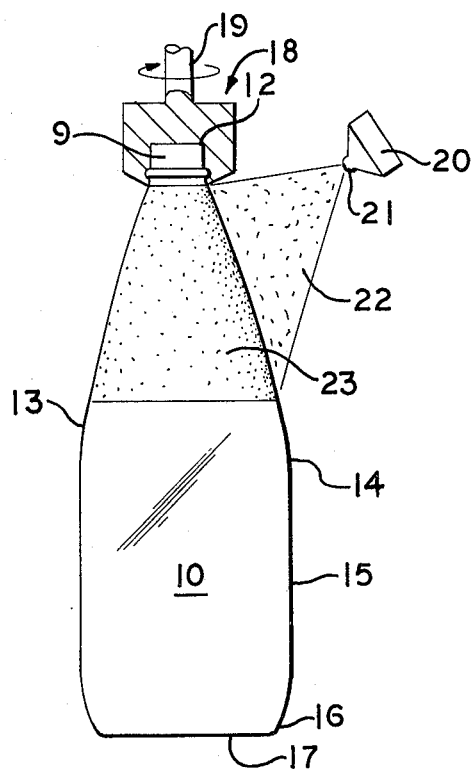
FIG. 1
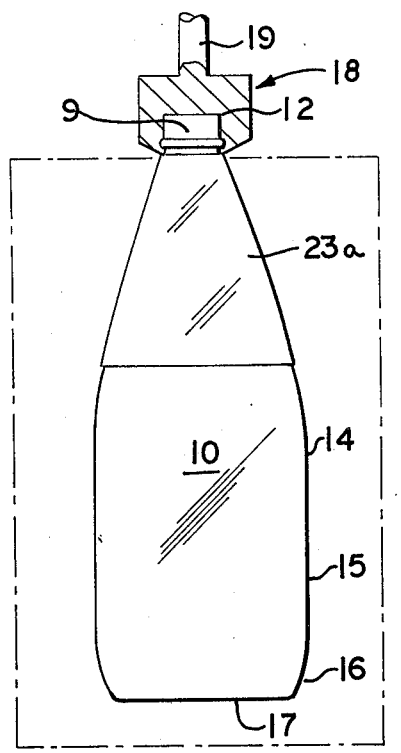
FIG. 2
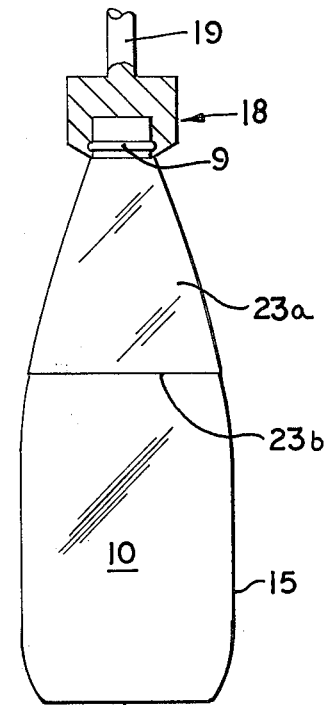
FIG. 3
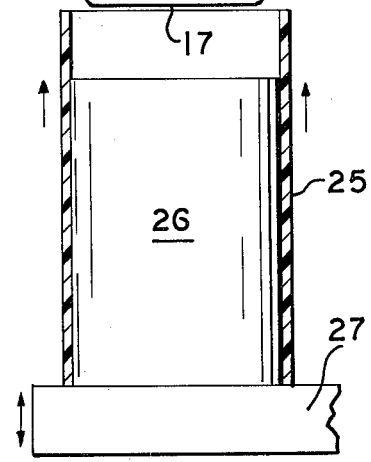

COATED GLASS CONTAINER AND METHOD OF MAKING SAME

The invention relates to an improved container in which is utilized glass and plastic to provide functional advantages of preservation of the strength of the glass by avoiding surface scratching, abrasions and the like during handling, and encapsulating the glass outer surface substantially so that should any breakage of the container occur, especially when product is packaged therein under considerable pressure or vacuum, the outer surface coating of plastic that is tightly placed thereover will retain glass particles and provide protection for the user from broken glass particles, i.e. such glass particles are likely retained within the plastic layer.

The invention constitutes an improvement of the container disclosed in U.S. Ser. No. 159,443 filed July 2, 1971, now U.S. Pat. No. 3,760,968.

SUMMARY OF THE INVENTION

The present invention provides a multiple-part plastic covering for containers, especially for glass bottles, with the objects herein mentioned.

It is an object of the present invention to provide a plastic covering that substantially encapsulates the outer surface area of the container.

Another object of the invention is to provide such plastic coverings that are both aesthetically advantageous and functionally improved in relation to containers.

A further object of the invention is to provide an encapsulated container having a sleeve covering thereon that protects the major area of the bottle from damage and provides labeling and decorative areas of the container which, combined with an overall further coating of a plastic encapsulating the glass outer surface and sleeve, offers the combined advantages of a label, protection from abrasion and fragment retention features.

Still another object of the invention is to provide a multi-part exterior coating of plastic materials on a container that is readily and economically manufactured.

The invention includes as an important object the provision of a method for making a multi-part encapsulation covering of plastic materials that is economical and practical to carry out.

In describing the invention, the term "container" as used herein shall include glass articles, such as narrow neck and wide mouth bottles and jars, tumblers, cruets and the like, as well as cylindrical containers of metal and composite paper and foil cans.

Presently, cylindrical metal containers, especially of the two-piece drawn and ironed aluminum variety of cans, are produced with the object of reducing wall thickness, thereby reducing strength and durability in the handling before and after filling with product. The present invention, as applied to such containers, lends itself readily to such articles for providing a surface protection during handling and use; thereby making practical the use of further reduced metal wall thicknesses of the metal container.

Several other attendant objects and advantages of the invention will become apparent to those skilled in the art from the descriptions and drawings of the invention, as will presently appear.

BRIEF DESCRIPTION OF THE DRAWINGS

FIG. 1 is an elevational view of a glass bottle for the first embodiment of the invention, showing the application of a plastic material in powdered form which is sprayed over the upper shoulder and neck regions of the bottle.

FIG. 2 is an elevational view of the coated bottle of FIG. 1 in a heating chamber fusing a plastic powder to form a uniform plastic coating on the bottle.

FIG. 3 is an elevational view, partly in section, of the coated bottle of FIG. 1 showing the plastic sleeve about to be placed over the body of the bottle.

DESCRIPTION OF THE INVENTION

Figure 4:
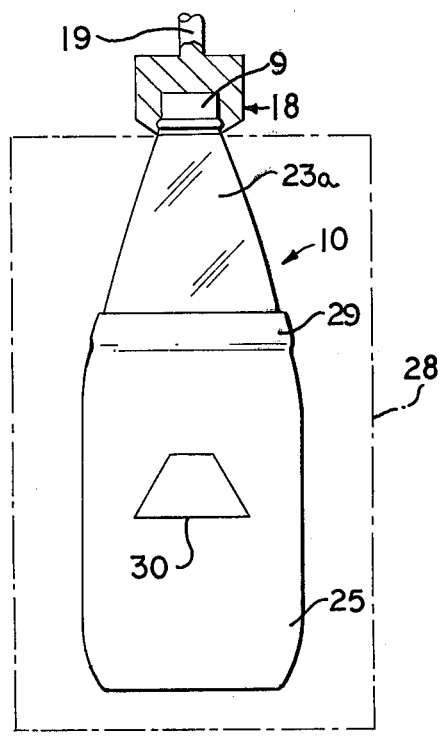
FIG. 4 is an elevational view of the bottle of FIG. 3 with the plastic sleeve shrunken in place thereon while in a heating chamber, the plastic sleeve overlapping the plastic coating on the neck region of the bottle.
Figure 6:
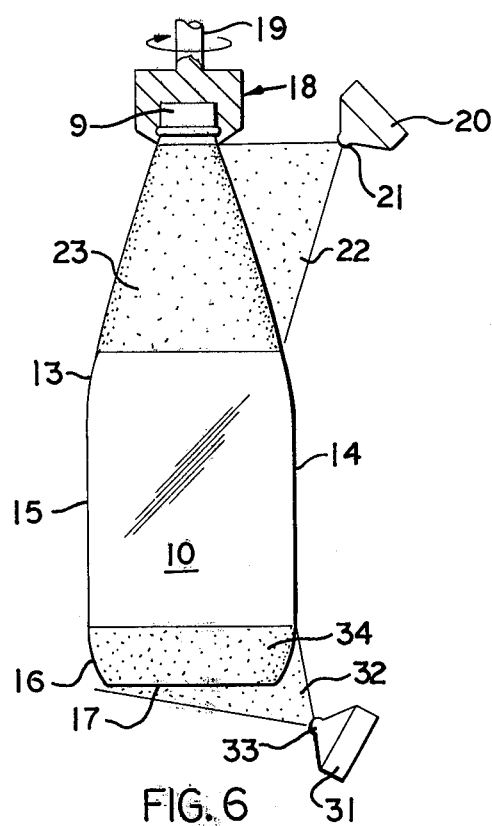
FIG. 6 is an elevational view of a bottle for the second embodiment of the invention, showing the spray application of powdered plastic material over the shoulder and neck regions and the bottom and heel regions of the bottle.

Referring to the drawings, a container in the form of glass bottle 10 (FIGS. 1 and 5) has a mouth opening 11 defined by a rim 12 of a bottle finish 9 at the upper end of an inwardly tapering neck 13. The neck 13 blends in the curvature of the bottle side wall at the shoulder 14 that is contiguous with the body 15. Body 15 represents the major or maximum diameter of this type of bottle, a narrow neck form of bottle. The lower reach of body 15 describes a corner radius 16 or heel joining the bottom end 17 of the bottle. The usual design of bottle 10 and numerous other forms of containers, i.e. two-piece metal cans, wide mouth jars, or the like, provide a bottom end 17 that is a slightly concave bottom end surface or, in some cases a "push-up" bottom, such that an annulus portion 8 of some width (bearing ring) of end 17 supports the container when placed upright on a flat horizontal surface.

FIRST EMBODIMENT OF THE INVENTION

Figure 5:
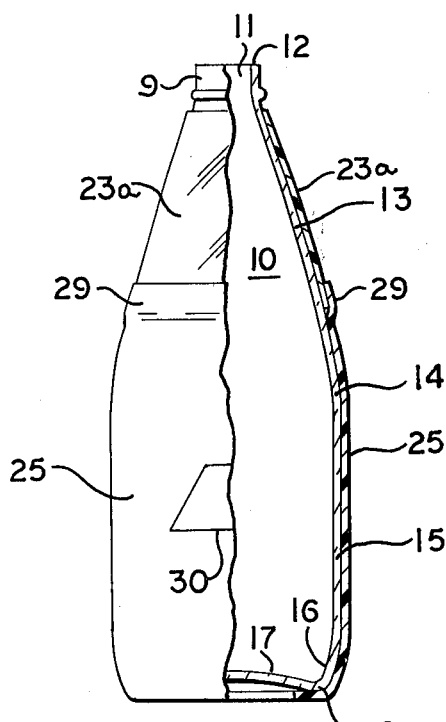
FIG. 5 is an elevational view, broken away and one-half in section, of the bottle produced in the steps performed on FIGS. 1–4.

On FIGS. 1–5, the steps for performing the method of making the bottle shown on FIG. 5 are illustrated. The bottle 10 is held in a holder or chuck 18 attached to a central shaft 19. Shaft 19 is rotated to impart rotation to the bottle in the coating station shown on FIG. 1. The shaft 19 is attached to a carriage means (not shown) for carrying the bottle through various steps and stations of the production process.

In the coating station, FIG. 1, a spray head 20 of a powder spray apparatus is supported in a spaced relation to the upper part of bottle 10. The nozzle 21 of spray head 20 spans the axial portion of bottle 10 covering most of the neck region 13. Spray head 20 is connected to pressure and a supply of a finely divided powder of a plastic composition which is forced out of the nozzle in a spray head 22 directed onto the bottle, and, since the latter is rotating in the coating station, the powdered plastic is deposited as a layer of particles 23 in an annular band covering on neck 13.

The powder spray is controlled to deposit a layer 23 of the plastic on the order of 2 to 20 mils thick. This powder is a form of in situ formation of a plastic film on the container. The powdered plastic material may be of a thermoplastic composition, such as polyvinyl chloride, polyethylene, polystyrene, copolymers of carboxylic acid containing monomers with ethylene which is sold in one form under the trade name "Surlyn", ethylene vinyl acetate, polyurethanes and polyamides. The plastic layer may also be formed of thermoset plastic materials, such as hot melt compositions; or sprayed in an emulsion or suspension with a vehicle or solvent that is volatilized in forming the film on the surface. In the use of powders, the particle size preferred for an even coating and good deposition is on the order of 10 to 100 microns.

The bottle 10 is preferably heat conditioned prior to spraying in the coating station. Depending on the material of the plastic being utilized in the spraying and the type of spraying equipment employed (for example, using thermoplastic powder spray), the glass of the bottle should be preheated to a temperature in the range of 75° to 600°F. at the time the powder is sprayed. The heat in the glass will assist in attracting the powder particles onto the surface and once they contact the surface the heat will effect a softening or tacky condition of particles of the plastic powder, helping hold a good surface coating for subsequently fusing and curing.

Should an electrostatic spray gun be utilized in spraying the powder, the preheated condition of the bottle assists in the operation of the electrostatic equipment, e.g. raising the temperature of the glass enhances its conductivity.

Certain economies in applying the powder spray may be realized if the spray head 20 is of the electrostatic spray gun variety, such as sold by Ransburg Corporation of Indianapolis, Indiana as their R-E-P Electrostatic Gun, or sold by the DeVilbiss Company of Toledo, Ohio as their Electrostatic Powder Gun, Model EHP-1501.

After the bottle is powder coated, as shown on FIG. 1, it is next carried to a heat chamber, usually in the form of a tunnel oven, schematically represented at 24 in FIG. 2. The temperature in chamber 24 is controlled such that it heats the powder particle layer 23 on the bottle sufficiently to cause the particles to melt and flow into a film or plastic layer 23a on the bottle. Suitable temperatures and times for performing this fusion step in the oven chamber 24 are known to those skilled in the art. The heat symbolized by the unit 24 may also be in the form of infra-red heaters that are either known electric or gas energized units. The infra-red heaters may be mounted in longitudinal banks along the path of the conveyor for the containers and the containers rotated about their central axes to distribute the heat. Heat of chamber 24 may be furnished by other known means.

It is desirable to utilize plastic compositions that appear as a transparent film 23a on the bottle. As will be apparent hereinafter, the next part of the coating is most often preferred to be translucent or opaque to provide a label or decorating panel for the bottle. Thus, in having the upper part 23a of the coating transparent, the contents of the filled bottle are readily visible to the user.

In some cases, however, full protection of the contents to light radiation may be desirable. One example of this is in packaging beer which is sensitive to spoilage from prolonged ultraviolet radiation. Another example is in the packaging of certain chemicals or pharmaceuticals where light radiation may have a detrimental effect on the contents of the bottle. In such cases, the plastic selected for use may be pigmented and applied in thickness of the film to provide an opaque or nearly so covering on the neck of the bottle.

After fusing the powder coating 23a, the bottle may be stored for a time or carried directly to the next step of the process. It is preferable in bringing bottle 10 to the sleeve applying station (FIG. 3) that it be thermally preconditioned. This step calls for heating the glass bottle to a temperature on the order 150°–400°F.

A sleeve 25 of a plastic material is assembled to the bottle of FIG. 2 at the sleeve assembly station, illustrated on FIG. 3. The sleeve 25 may be of seamless variety cut from a tube of an oriented thermoplastic. The orientation of the plastic is predominately in the circumferential dimension of the tube so that upon subsequent application of heat, the sleeve will shrink radially (very little if any shrinkage axially) about the bottle. The sleeve 25 has an internal diameter that is slightly greater than the outer diameter of the body 15 of bottle 10. The axial length of sleeve 25 is in excess of the distance from the lower margin 23b of neck film 23a to the bearing ring 8 on bottom end 17 of the bottle. The length of sleeve 25 should be sufficient to overlap film coating 23a (indicated at 29 on FIG. 5) along the neck region of bottle 10 and cover the shoulder and body regions 14 and 15, respectively, the heel region 16 and an annular portion of the bottom 17, such as bearing ring 8.

The sleeve 25 may also be formed into a tube from a rectangular sheet of heat shrinkable plastic material having the opposed side margins of the sheet overlapped on one another and seamed. In this form of sleeve, the plastic is highly oriented in the direction running from one side margin to the other so that when the sides are overlapped and seamed, the resulting sleeve is highly oriented in the circumferential dimension.

Sleeve 25 is, in either event, substantially a hollow cylinder and is carried with the central axis vertically positioned on a mandrel 26. Mandrel 26 is attached to a support member and is encircled by a stripper ring 27 (shown on FIG. 3 in its lowermost position) connected to a mechanism (not shown) that is reciprocally driven vertically. Sleeve 25 over mandrel 26 is telescopically stripped and moved upwardly over the bottom end 17 of bottle 10 by upward movement of stripper ring 27 to a desired elevation until the upper edge of the sleeve extends vertically beyond the lower margin 23b of film coating 23a.

The lower marginal edge of sleeve 25 preferably extends vertically below the plane of bottom end 17 of the bottle a short distance, whereupon the shrinking of sleeve 25 about bottle 10 will cover an annular segment of the bottom end 17 corresponding or nearly so to the bearing ring 8.

The bottle and sleeve 25 thereon is next taken to an oven chamber, represented on FIG. 4 schematically by phantom outline 28, wherein the temperature is sufficient to shrink the plastic to a tight bottle conforming shape extending from the bottom end 17 to an overlap 29 with plastic film covering 23a (see FIG. 5).

The material of sleeve 25 may be selected from innumerable thermoplastics capable of being highly oriented in one dimension, including those compositions in a prefoamed, partially formed or sheet (non-foamed) form. The sleeve 25 is in most cases preferably decorated with lettering, label, decoration or the like for identifying the contents of the container, plus adding decorative properties to the package. This decoration may be applied to a web of the flat stock before the rectangular sleeve blanks are cut therefrom, or may be applied after forming the sleeve. Flat printing of the web or seamless tube stock is preferable from the standpoint of ease of decorating. In placing the decoration on sleeve 25, as described, the need for providing paper or foil labels of the usual variety is eliminated. This decoration of sleeve 25 is represented on the drawings, FIGS. 4 and 5, by the outline 30.

Examples of thermoplastic materials suitable for making the sleeves 25 are polystyrene, medium or low density polyethylene, copolymers of carboxylic acid containing monomers with ethylene (sold as Surlyn), polypropylene, cellulose propionate, cellulose butyrate, cellulose acetate butyrate, polyvinyl chloride, cellulose acetate, polyamides and polyurethanes. The examples name but some of the many available compositions of heat shrinkable thermoplastics that are available in film or sheet. Many of these examples are available in pre-foamed stock. Other plastic materials may be utilized that are contractible circumferentially, at least, in sleeve form, such as by chemical action, solvent evaporation or by mechanical working techniques alone or in conjunction with solvent or a vehicle evaporation. Accordingly, the plastic member 25 may be formed on the bottle by a variety of techniques to provide a snug fitting member 25 in combination with a film 23a. The preferred form of sleeve 25 is a heat shrinkable thermoplastic. The preferred thickness of the sleeve material is on the order of 0.01 to 0.04 inches for the pre-foamed material and 0.003 to 0.007 inches thickness for the non-foamed materials. The thickness of the sleeve may be selected in the interest of function of the covering and economy of the resulting package.

The materials of the several examples given above will shrink in the heating step illustrated on FIG. 4 in temperatures ranging from about 100° to 650°F. The upper limit of the shrink temperature should not exceed a temperature at which either of the plastic materials on the bottle will decompose or degrade.

SECOND EMBODIMENT

Referring to FIGS. 6–9, a second embodiment of the invention will be described. The glass bottle 10 is carried by the carrier and chuck 18 through a coating station in the manner described in connection with FIG. 1. At the coating station, the first spray nozzle 20 is utilized to issue a band 22 of powdered plastic material onto the rotating bottle neck 13 and apply a powder coating to the neck portion, indicated at 23. Also, in the coating station, a powdered plastic material of similar variety is issued from the lower spray gun device 31, issuing as a band 32 of powder spray from nozzle 33 onto the bottom 17, heel 16 and a lower adjacent part of the body 15 of the bottle. Rotation of the bottle 10 by the carrier 18 applies the uniform coating of the powder, indicated by 34, over this much of the bottle's exterior surface.

At the time the bottle 10 is brought into the coating station, it is preferably in a pre-heated condition as was earlier described under the first embodiment of the invention. The plural powder sprays emitted from nozzles 21 and 33 may be operated sequentially or concurrently, as desired, the latter being illustrated on FIG. 6. Upon completion of the spraying step at the coating station, an upper annular layer 23 of the plastic powder encircles a major portion of neck 13 and a layer 34 of the plastic powder encircles the lower body 15, the heel 16 and the bottom end 17.

Figure 7:
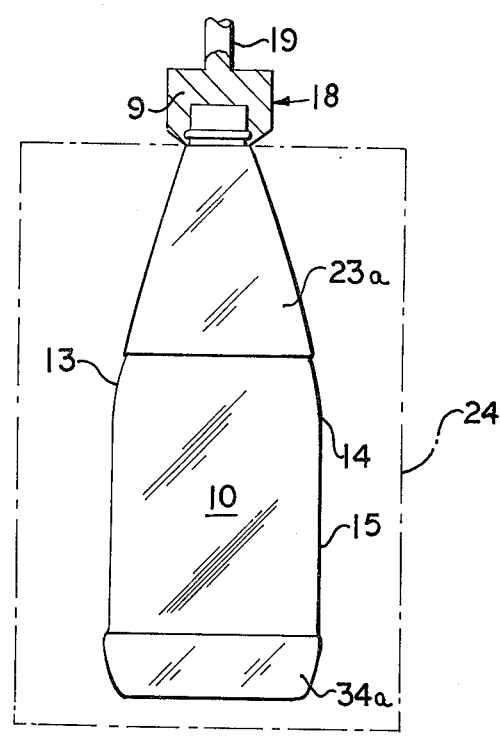
FIG. 7 is an elevational view, similar to FIG. 2, of the bottle coated in accordance with FIG. 6 in a heating chamber fusing the plastic powder to a plastic coating.
Figure 8:
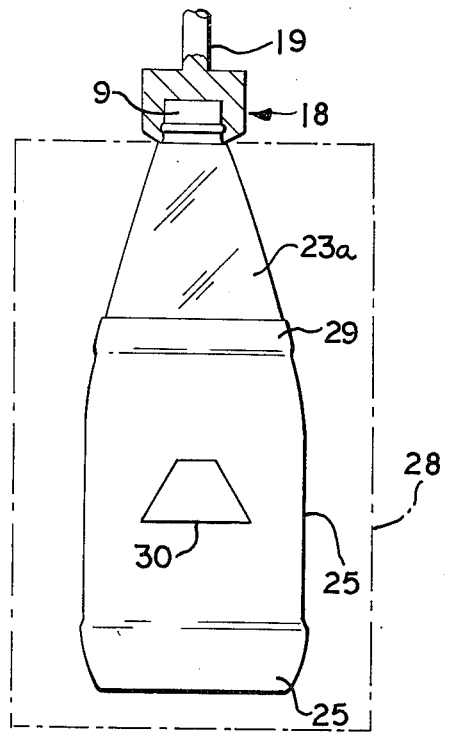
FIG. 8 is an elevational view, similar to FIG. 4, of the bottle of FIG. 7 with a sleeve of plastic thereon shrunken in a heating chamber, the plastic sleeve overlapping both the upper and lower coatings of FIG. 7 on the bottle.

The coated bottle is next carried by its chuck 18 to a heating apparatus, indicated schematically at 24 on FIG. 7, wherein the bottle and powder thereon is heated sufficiently to fuse the powder into the spaced apart, in situ formed, plastic film layers 23a and 34a on the adjacent exterior surface areas of the container.

Figure 9:
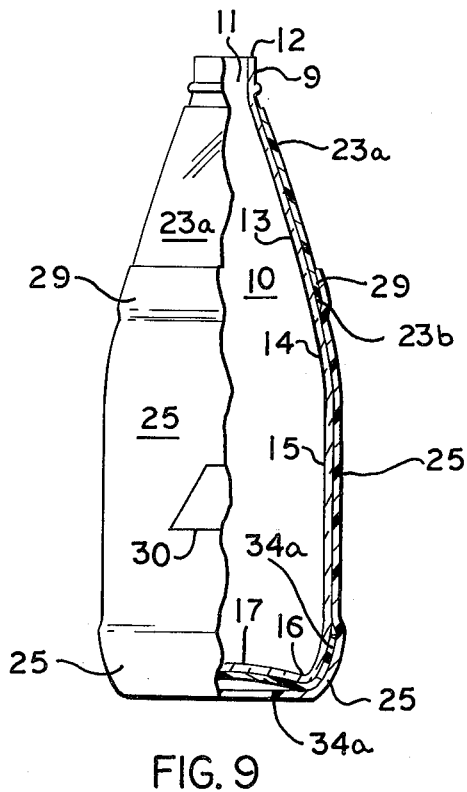
FIG. 9 is an elevational view, broken away and one-half in section, of the bottle produced in the steps illustrated on FIGS. 6–8.

The container with the first covering of plastic thereon may be next cooled and thereafter further heat conditioned preparatory to the application of the second plastic covering. This application is carried out in the manner illustrated on FIG. 3 wherein the bottle of FIG. 7 having the film coverings 23a and 34a thereon is brought to the station for telescopically moving a preformed plastic sleeve 25 of a heat shrinkable thermoplastic material (described earlier herein) past the bottom end of the bottle to a height such that the upper end of the sleeve 25 substantially overlaps the lower edge margin 23b of the neck coating in the area 29 (FIG. 9). The internal diameter of sleeve 25 should be slightly greater than the external diameter of the bottle at the covering 34a, or external diameter of the body 15, whichever is largest. The sleeve 25 will be of sufficient length, preferably, so that the lower end extends downwardly beyond heel region 16. The bottle and sleeve, just described, is next moved into a heating apparatus 28, illustrated somewhat schematically on FIG. 8, wherein sufficient heat is applied to shrink the sleeve 25 into snug fitting contact over the bottle neck 13 and a part of its film 23a, the bottle shoulder 14, bottle body 15 and a portion of the lower film 34a. As is the case described for the heater apparatus 24, the heater 28 may be one of several forms, e.g. a tunnel with circulated hot air, or parallel banks of infra-red heaters (gas or electric) and past which the containers are conveyed and axially rotated on the chucks 18. The infra-red heaters may be preferred in the event regional heat or regional concentration of heat is desirable. In the preferred form, the lower end of sleeve 25 will extend onto the bottom of the bottle and overlie the film 34a thereon over bearing ring 8. The final article, after it is removed from heating apparatus 28, is shown partly in section on FIG. 9.

THIRD EMBODIMENT

Figure 10:
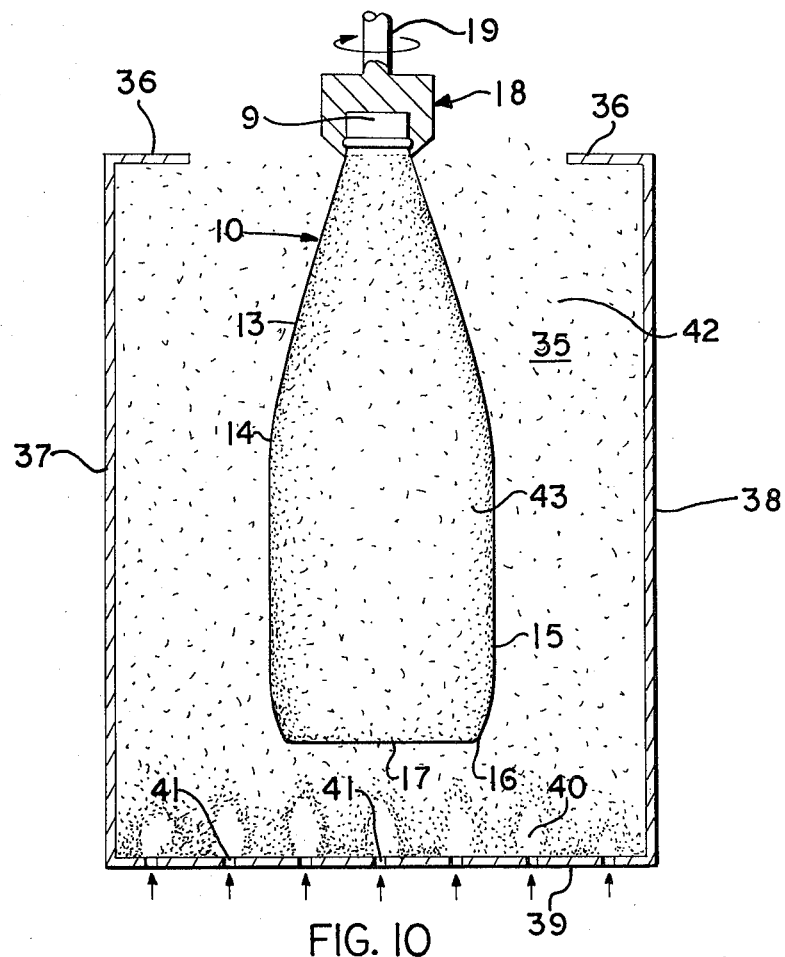
FIG. 10 is a sectional elevational view, somewhat schematically illustrating a fluidized bed apparatus and a bottle therein undergoing surface coating of a powdered plastic material for the third embodiment of the invention.
Figure 11:
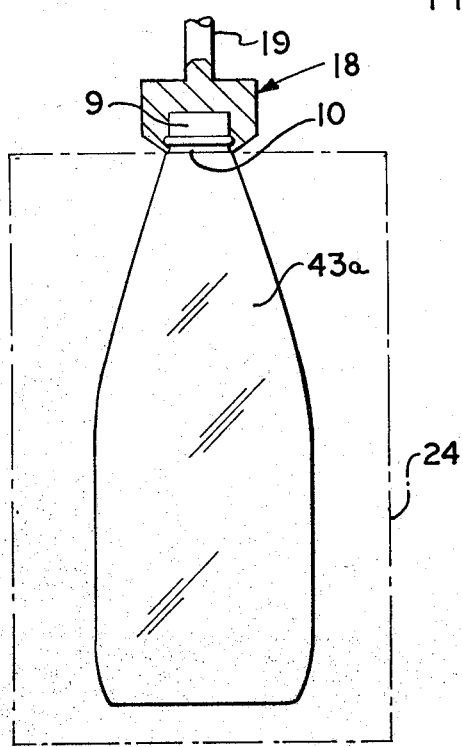
FIG. 11 is an elevational view of a bottle coated in accordance with FIG. 10 in a heating chamber fusing the plastic powder to a plastic coating over the entire exterior surface of the bottle.
Figure 12:
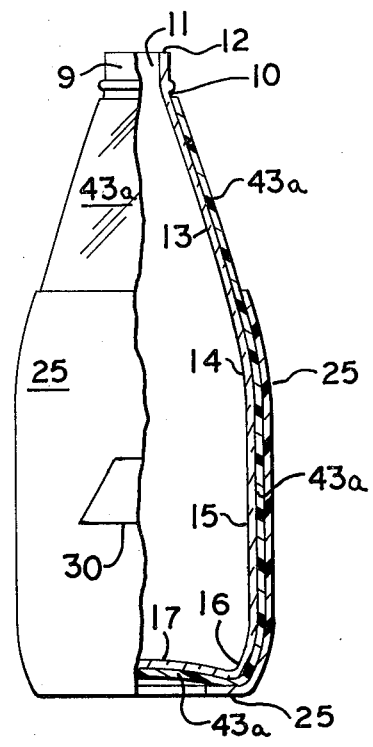
FIG. 12 is an elevational view, broken away and one-half in section, of the coated bottle from FIG. 11 after a shrinkable plastic sleeve is applied thereon and shrunken by heat in the manner shown on FIGS. 3 and 4.

Referring to FIGS. 10–12, a third embodiment of the invention will be described. The glass bottle 10 is carried by the carrier and chuck 18 into a fluidized bed of powdered plastic material at a coating station. The fluidizing chamber 35 consists of an elongated, tunnel-like structure having a top wall 36 providing a slot-like opening for travel of the bottle and chuck lengthwise of chamber 35. The chamber is housed by spaced, lengthwise side walls 37 and 38 and a perforate bottom wall 39. A supply of the powdered plastic material 40 is provided along bottom wall 39 and a fluidizing medium (a gas) is supplied under some pressure from a source (shown by arrows of FIG. 10) beneath wall 39 and into the several openings 41 therein. The powder forms a cloud of particles 42 in the chamber 35 and bottle 10 is carried through the cloud 42 and rotated.

Fluidized bed devices for powder coating articles are available commercially in two known forms, i.e. fluidized beds for powder coating articles and fluidized chambers wherein an electrostatic assist is utilized to charge the powder particles in the cloud and attract them to the surface of the article being coated. The invention may be practiced with either type of unit.

Upon traversing the chamber 35, a coating of powder particles 43 is applied onto nearly the entire exterior surface area of bottle 10. It is preferable to mask off the upper finish area 9 of the bottle adjacent the upper end of neck 13 whereat the bottle closure will be later applied. The bottle 10, at its introduction into a fluidizing chamber 35, is best preheated to suitable temperature (in the range 75° to 600°F.) for successful operation of the fluidizing process and adhering particles onto the outer glass surface areas. Fluidized powder of some compositions will best adhere to the glass if the bottle is preheated such that the particles may become slightly tacky after engaging the heated glass wall. In the use of electrostatic assist in the fluidizing device, a heated bottle enhances the electrostatic properties of the glass and the electrostatic system.

After the powder coating 43 is applied, the carriage for the bottle introduces the article into an oven or heating apparatus 24, illustrated schematically on FIG. 11.

The heat supplied in chamber 24 is sufficient to fuse the powder particles of the encapsulating layer 43 on the bottle into a plastic film layer 43a (FIG. 11). This film layer 43a extends from an elevation adjacent the neck finish 9 at the top of the bottle and encircles the remainder of the bottle including neck 13, shoulder 14, body 15, heel 16 and bottom end wall 17. The plastic coated bottle of FIG. 11 is next transferred to a sleeve applying station, such as earlier illustrated on FIG. 3, whereat a plastic sleeve 25 is axially telescopically shifted over the film 43a to desired height. At the time the sleeve 25 is applied, the bottle 10 and its plastic film 43a has been preheated to a predetermined elevated temperature suited for the material of the sleeve.

The bottle composite and sleeve 25 are next moved into an oven or heat tunnel 28, as shown and described earlier under FIG. 4, wherein the heat shrinkable sleeve 25 is shrunken into snug fitting engagement over the film surface 43a on the bottle (see FIG. 12). In this form of container embodiment, the entire outer surface of the container is encapsulated with the one plastic member 43a, and the shoulder 14, body 15, heel 16 and bearing ring 8 of the container are covered with the cushioning sleeve member 25, which member 25 also bears the surface decoration 30 for the container package.

FOURTH EMBODIMENT

Figure 13:
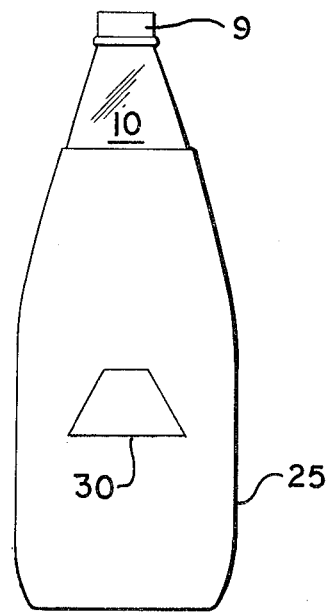
FIG. 13 is an elevational view of a bottle having a sleeve of heat shrinkable plastic shrunken over the bare glass exterior surface in the manner illustrated on FIGS. 3 and 4.
Figure 14:
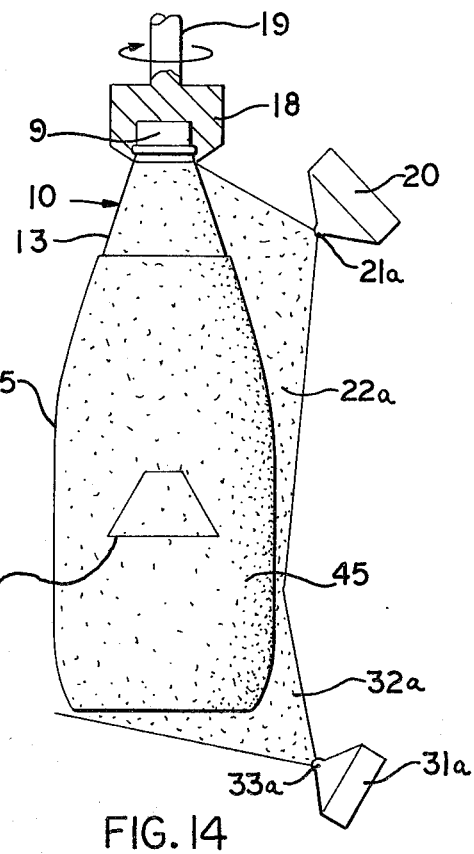
FIG. 14 is an elevational view of the bottle of FIG. 13 undergoing spray application of powdered plastic material over the entire bottle area covering the exposed outer surface of the glass and the shrunken sleeve thereon for the fourth embodiment of the invention.
Figure 15:
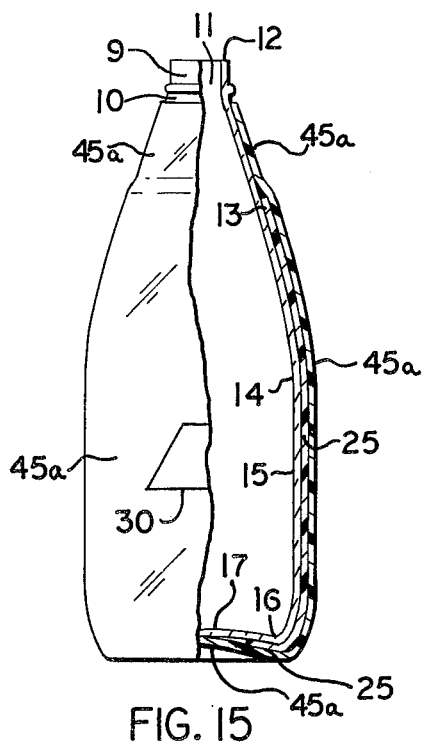
FIG. 15 is an elevational view, broken away and one-half in section, of the coated bottle of FIGS. 13 and 14 after the sprayed powder coating has been fused in a heated chamber such as illustrated in FIG. 11.

Referring to FIGS. 13–15, with further reference to FIGS. 3, 4 and 7, a fourth embodiment of the invention will be described. The preheated bare glass bottle 10 is first carried by its chuck 18 to a sleeve applying station (FIG. 3) whereat a plastic sleeve 25 of heat shrinkable material is axially shifted over the surface of the bottle 10 to surround at least a part of the neck 13, shoulder 14, body 15, heel 16 and extend beyond the end 17 of the bottle a certain distance. The sleeve 25 may bear the decoration 30 (FIG. 13) at the time it is applied.

The assembly of bottle 10 and sleeve 25 is next brought into the heat environment of chamber 28 (FIG. 4), whereat sufficient heat is supplied to shrink sleeve 25 snugly onto the bottle surfaces mentioned and onto an annular portion of bottom end 17 of the bottle.

Thereafter, the bottle with sleeve 25 shrunken thereon is conveyed to a spray coating station, such as shown again on FIG. 14. The spray coating may be carried on by two alternate techniques, depending upon the desired end product.

A first technique is illustrated on FIG. 14. Upper and lower spray heads 20a and 31a have nozzles 21a and 33a, respectively, which emit bands of plastic powder particles 22a and 32a that merge and provide powder spray extending the length of the bottle up to the finish 9. The bottle in chuck 18 is rotated by shaft 19 and the bands 22a and 32a of the powder spray wrap around or encircle the bottle as powder layer 45 overcoating the upper exposed glass surface, the plastic coated area of shrunken sleeve 25 and the central exposed glass area of the bottom end of the bottle. This will form a full envelope about the bottle and sleeve.

Next the bottle is moved into a heating apparatus 24, such as the unit shown schematically on FIG. 7, wherein sufficient heat is supplied to fuse the powder coating into an encapsulating film of plastic 45a (FIG. 15). The plastic layer 45a covers the entire exterior of the bottle, exclusive of finish 9, and the plastic sleeve 25 previously shrunken thereon. The decoration 30 will appear through the film layer 45a in instances where the plastic powder composition is one that is transparent after fusion. Or, in certain instances, a frosty effect or other decorative effects may be achieved by using plastic powder compositions that when fused are transluscent or tinted to be so.

Another variant of the just-described embodiment may be practiced. Although it is not specifically and separately shown on the drawings, the container of FIG. 13, having a sleeve 25 shrunken over the glass surface of a bottle 10, is coated as shown and described on FIG. 6. In this instance, the plastic powder is sprayed so as to cover neck 13 and an upper marginal portion of the shrunken sleeve 25. Simultaneously or successively with the upper spray of powder, a lower spray band of powder may, if desired, be applied to cover a lower body and heel segments of the sleeve 25, the annular portion of sleeve 25 on the bottom of the bottle and the uncovered glass area of the bottom of the bottle. By heating and fusing the powder into a plastic film, the sleeve 25 is joined with a top and bottom film cover forming an overlapping, joined, three-part cover of plastic encapsulating the bottle surface. Or, merely the neck film may be formed (the heel film omitted) to make still another form of the coated container. In either case, the central body part of the sleeve 25 bearing a decoration 30 need not be covered by the film plastic.

A further modification may be employed for this embodiment. Neither is this shown specifically on the drawings, but should be readily understood from description of the modification in conjunction with the showing on FIGS. 13, 10 and 7. The powder of the outer plastic layer 45a may be applied on a preheated bottle having sleeve 25 shrunken thereon by utilizing the fluidized bed type apparatus shown on FIG. 10. The powder, applied as in the technique of FIG. 10, is then fused into a film layer on the bottle by heating in a heating apparatus 24, such as taught on FIG. 7.

The various embodiments disclosed for the invention provide added safety in the use of frangible containers, such as glass bottles, in the packaging of product under positive pressure and, in some cases, under vacuum (negative pressure). Should a fracture of the frangible vessel occur, especially in such pressure uses, loose fragments of the frangible material will be contained by the encapsulation layers of the plural plastics on the container's outer surface.

It should be understood that although the invention is disclosed in its preferred embodiments mainly with respect to a glass bottle, some of the advantages of the invention may be applicable when used in connection with containers of other materials, e.g. cans, two-piece drawn and ironed cans of aluminum or tin plate, fiber containers, such as are manufactured from a spirally wound paper body combined with metal ends.

Other and further modifications and variants of the invention should occur to those skilled in the art and which can be affected within the spirit and scope of the invention, as described hereinabove, and as defined in the appended claims.

What is claimed:

1. An article of manufacture comprising a glass bottle having a body portion and opposed neck and bottom end portions together providing the outside surface area of the bottle, the said neck end portion defining a mouth opening, and plural separate, distinct and different organic plastic cover members snugly engaging adjacent contiguous regions of said surface area of the bottle, said cover members being overlappingly connected to each other on the bottle surface and covering the neck and body areas thereof and at least a portion of its bottom area, said plural cover members overlying each other over at least one portion of the outside area of the bottle, said plural organic plastic cover members comprise a first member formed in situ on the bottle and a second preformed member of contractible plastic material telescopically encircling a portion of the area of the bottle and in shrunken snug engagement thereover, said plastic cover members substantially encapsulating said bottle.

2. The article of claim 1, wherein said first member is a plastic film covering the neck area of the bottle and said second preformed member is overlappingly connected at one end to the first member and extends over at least the body portion of the bottle.

3. The article of claim 2, wherein said second preformed member also extends over a portion of the bottom end of the bottle.

4. The article of claim 1, wherein said plural plastic cover members comprise a first plastic film member covering the neck area of the bottle and a second plastic film member covering the bottom end of the bottle, and a third preformed plastic member of a shrinkable plastic material shrunken thereon, said third member being overlappingly connected at its one end to the first plastic film member on said neck area and overlappingly connected at its opposite end to the second plastic film member on said bottom end.

5. The article of claim 2, wherein said first member of the plural plastic cover members comprises a plastic film covering substantially all of the exterior surface area of the bottle, and said preformed second member of the plural plastic cover members is in overlying relationship on said film encircling at least a substantial portion of the body of the bottle.

6. The article of claim 1, wherein said plural cover members include a first cover member comprising a preformed sleeve of heat shrinkable plastic material shrunken onto the body of the bottle in snug fitting encircling relationship, and an outer second member on the exterior glass surface of the bottle and overlying at least a portion of said sleeve which comprises a plastic layer formed in situ on the exterior surface of the bottle and at least a portion of said sleeve, said second member covering all of the exposed outer glass surface area of the bottle and at least a portion of said sleeve.

7. The article of claim 6, wherein said outer second member covers all of the exterior surface area of said sleeve.

8. The article of claim 1, wherein said plural cover members include a first cover member comprising a preformed sleeve of heat shrinkable plastic material shrunken onto the body of the bottle in snug fitting encircling relationship, and an outer second member on the exterior glass surface of the bottle and overlying at least a portion of said sleeve which comprises a plastic layer formed in situ on the neck surface of the bottle and at least a portion of said sleeve, the composite of said sleeve and outer plastic layer encapsulating substantially all of the exterior area of the bottle.

9. The article of claim 1, wherein said second preformed member of the plural cover members is comprised of a formed heat shrinkable thermoplastic material.

10. A container having a bottom end wall and a side wall connected with said bottom end wall, the improvement therein which comprises at least a portion of the side wall encased in a plastic film formed in situ on said wall and a portion of the side wall and bottom end wall of the container encased in a separate plastic sleeve member formed of contractible plastic sheet material encircling said container wall and shrunken thereon and in overlapping engagement with said plastic film, whereby the major outer surface of the container is encased by said in situ film and shrunken sleeve member.

11. The container of claim 10, wherein said shrunken plastic sleeve member is formed of a cellular, shrinkable, polymeric material that is shrunken in overlapping engagement with said plastic film.

12. The combination of claim 10, wherein said plastic film formed on the container comprises a copolymer of carboxylic acid containing monomers with ethylene.

13. The combination of claim 12, wherein said plastic sleeve comprises a heat shrinkable formed organic thermoplastic.

14. An article of manufacture comprising in combination:

a glass container having a neck portion defining a mouth opening at its upper end, an opposite bottom end portion and an intermediate body portion;

said body and bottom portions being joined at a lower corner and said neck and body portions being joined in a shoulder region of the container, the body portion having a maximum width dimension of said container;

an annular covering comprised of a layer of plastic film material formed in situ on said container as a continuous annular layer of said material overlying at least a major surface area of said neck portion;

a separate annular covering comprised of a layer of a different shrunken thermoplastic material as a continuous layer;

said separate annular layer overlying a portion of the first-mentioned annular covering and said body portion of the container axially spanning its said maximum width dimension;

said layer overlying said lower corner and a radially disposed annular region of said bottom end portion;

the combination of said annular coverings of the different plastic materials substantially encapsulating said container.

* * * * *

FO-1050
(5/69)

UNITED STATES PATENT OFFICE
CERTIFICATE OF CORRECTION

Patent No. 3,912,100       Dated    October 14, 1975

Inventor(s) Paul W. L. Graham, Thomas W. Moore, Jr., Charles F. Mann

It is certified that error appears in the above-identified patent and that said Letters Patent are hereby corrected as shown below:

Col. 3, line 33, "head" should be --band--

Col. 9, line 59, "affected" should be --effected--.

Col. 11, line 1 (Claim 9), "formed" should be --foamed--;

line 22 (Claim 13), "formed" should be

--foamed--.

Signed and Sealed this

Tenth Day of August 1976

[SEAL]

Attest:

RUTH C. MASON
*Attesting Officer*

C. MARSHALL DANN
*Commissioner of Patents and Trademarks*